(12) United States Patent
Brooks

(10) Patent No.: US 8,049,875 B1
(45) Date of Patent: Nov. 1, 2011

(54) TRIANGULATION AND LIGHT BASED ANGLE SETTING INSTRUMENT

(76) Inventor: Lan Elliot Brooks, Urbana, IL (US)

( * ) Notice: Subject to any disclaimer, the term of this patent is extended or adjusted under 35 U.S.C. 154(b) by 284 days.

(21) Appl. No.: 12/386,444

(22) Filed: Apr. 18, 2009

(51) Int. Cl.
*G01B 11/26* (2006.01)
(52) U.S. Cl. .................................................. 356/139.05
(58) Field of Classification Search ........ 356/3.01–3.15, 356/4.01–4.1, 5.01–5.15, 6–22, 28, 28.5, 356/139.01–139.1
See application file for complete search history.

(56) References Cited

U.S. PATENT DOCUMENTS 6,263,584 B1 * 7/2001 Owens ............................. 33/640
2003/0209678 A1 * 11/2003 Pease ........................ 250/559.19

* cited by examiner

*Primary Examiner* — Thomas Tarcza
*Assistant Examiner* — Luke Ratcliffe

(57) ABSTRACT

One embodiment of an instrument for setting the angle between two work pieces. In operation, the instrument is placed on one of the work pieces at a user determined distance from the apex of the angle being set. The instrument projects a light beam creating a light spot on the other work piece. When the light spot is aligned with a user mark on the other work piece the work pieces are aligned at the correct angle. Use of this instrument provides a positive and accurate indication that the work pieces are aligned at the desired angle.

16 Claims, 5 Drawing Sheets

Section A-A

Detail A

Detail C

Detail D

Detail B

US 8,049,875 B1

TRIANGULATION AND LIGHT BASED ANGLE SETTING INSTRUMENT

FEDERALLY SPONSORED RESEARCH

Not Applicable

SEQUENCE LISTING OR PROGRAM

Not Applicable

BACKGROUND

1. Field

This application relates to squares and protractors used in the construction and other trades.

2. Prior Art

This application relates to instruments for use in squaring and more generally in setting angles, and particularly, to a square or protractor incorporating a light beam generator mounted to project a beam at an angle to the base and used at a distance from the angle being squared.

Squaring devices and protractors having lasers for alignment are known. Some squares provide two and three simultaneous laser output beams at 90° and are placed at the apex of the angle being squared or set. Other devices include a laser and operable dial, where the dial allows the user to adjust the angle of the projected beam. These instruments are used by placing them at the apex of the angle being adjusted.

Other squares or protractors incorporate beams at an angle to the base for setting known angles relative to the base or have adjustable beams for adjusting to angles other than 90°. Common angles in these devices are 30°, 45° and 60°.

A common feature of the known squaring devices is that they require the square to be positioned at the apex of the angle being adjusted or measured.

This application presents an instrument that can be used to set two members to a specific angle to each other while positioned at a distance from the apex of the angle being squared or set. This provides a great advantage over the existing instruments. When the square or protractor is positioned at the apex of the angle, it present the problem of how to keep the instrument in position and aligned when the user needs to be at the end of one of the members that is away from where the two members meet. Typically, this is where the user is positioned when adjusting the angle between the two members. If this adjustment must be made while on a ladder, this factors present even greater difficulties for the user. Since the instrument presented in this application works at a distance from the apex; it can be positioned where the user is while making adjustments. A further advantage is that that since it works over greater distances, errors caused by warpage or maladjustments are averaged over greater distances. This results in a more accurate measurement.

DRAWINGS

Figures

Figure 1:
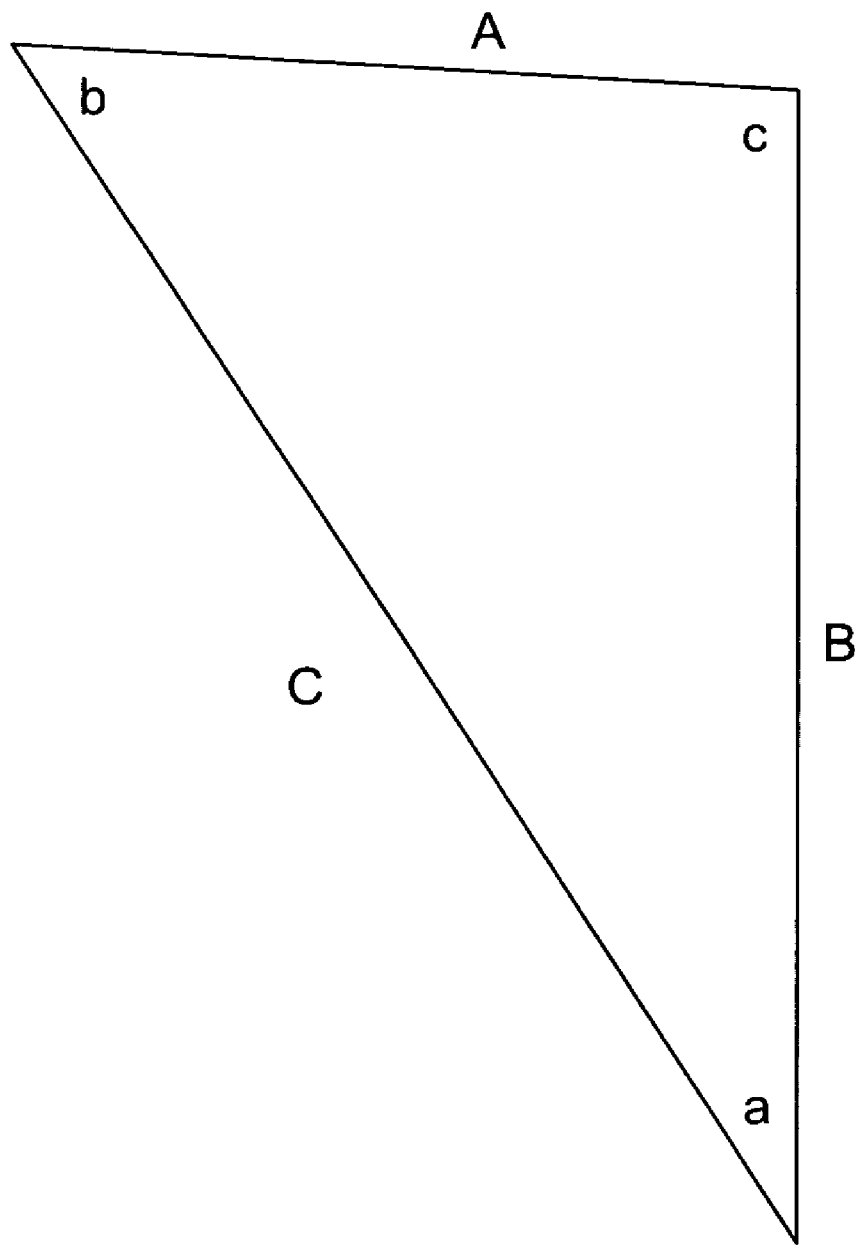
Figure 2:
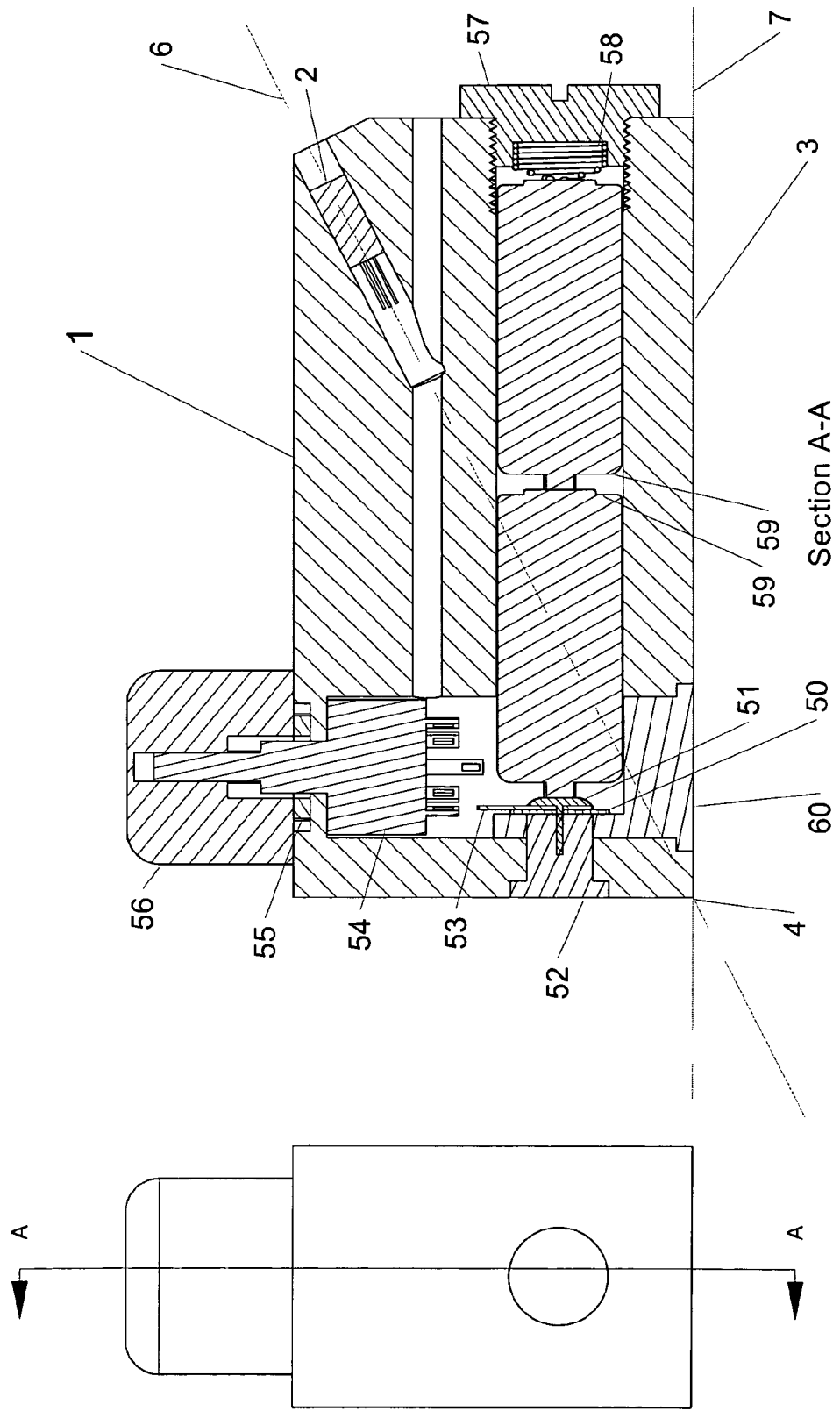
Figure 3:
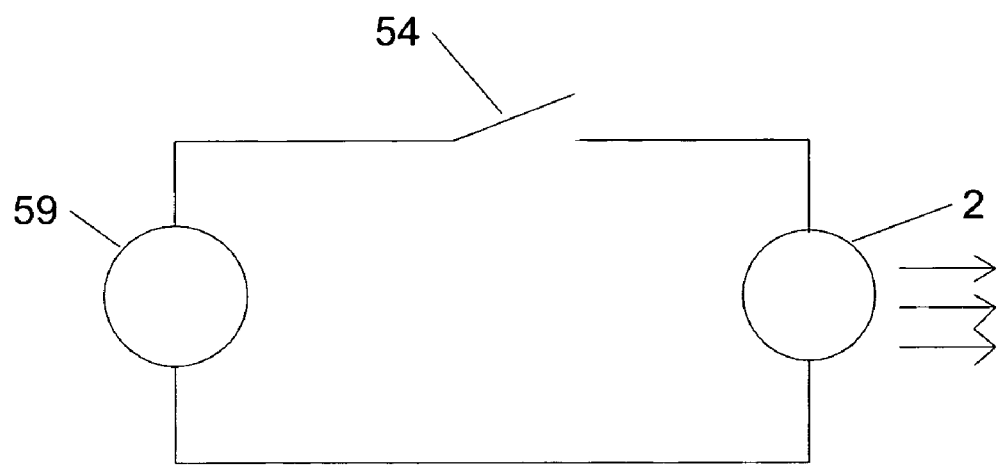
Figure 4:
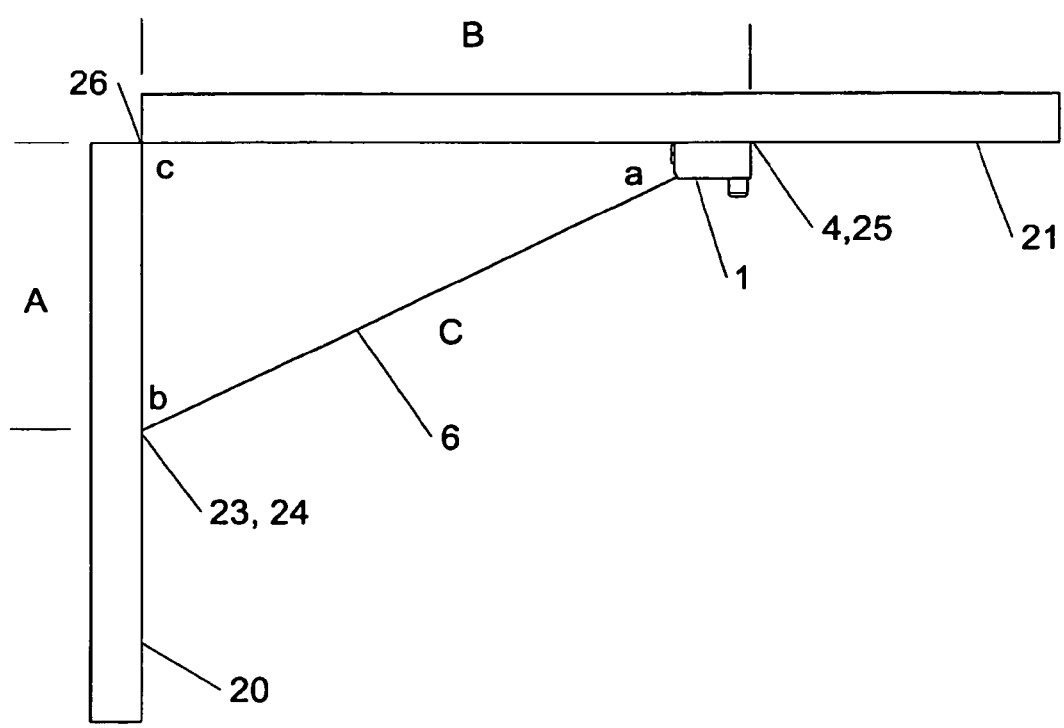
Figure 5:
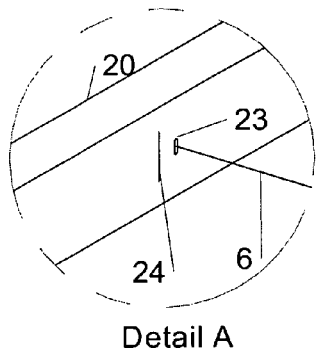
Figure 5:
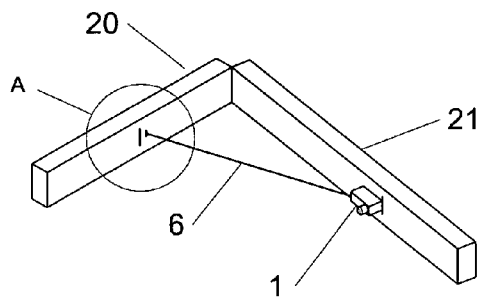
Figure 6:
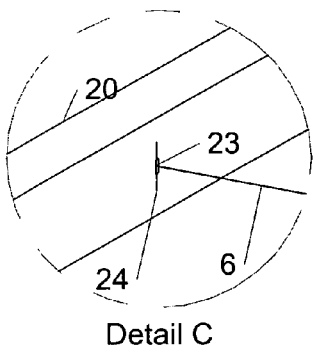
Figure 6:
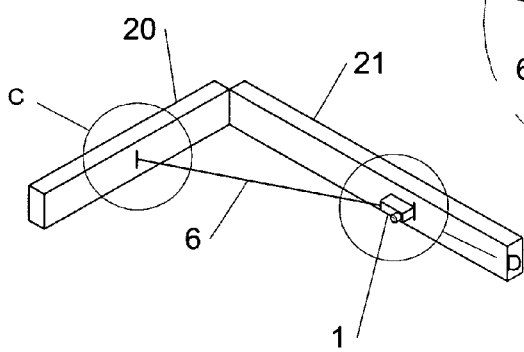
Figure 7:
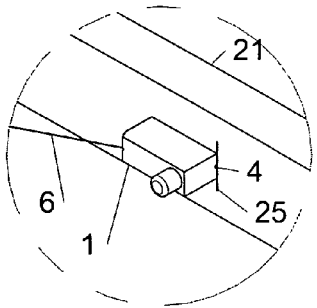
Figure 7:
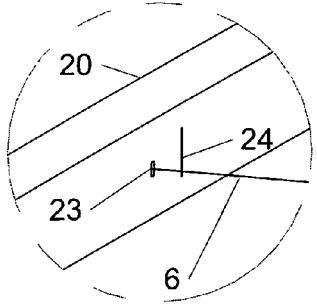
Figure 7:
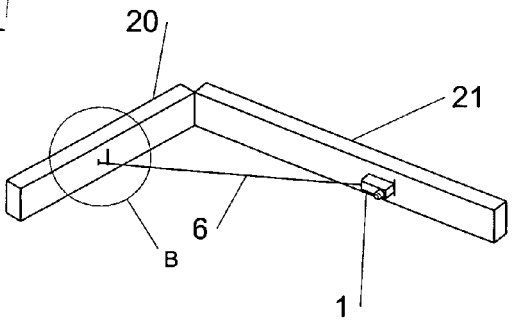

FIG. 1 is a drawing of a generalized triangle.
FIG. 2 is a cross section of a typical embodiment.
FIG. 3 is an electrical diagram of a typical embodiment.
FIG. 4 is a plan view of the instrument in use where the instrument uses an A:B ratio of 1:2 and angle c is 90°.
FIG. 5 is an isometric view of a typical embodiment in use where the instrument uses an A:B ratio of 1:2, angle c is 90° and where the work pieces are at an angle less than 90° to one another.
FIG. 6 is an isometric view of a typical embodiment in use where the instrument uses an A:B ratio of 1:2, angle c is 90° and where the work pieces are at an angle of 90° to one another.
FIG. 7 is an isometric view of a typical embodiment in use where the instrument uses an A:B ratio of 1:2, angle c is 90° and where the work pieces are at an angle greater than 90° to one another.

DRAWINGS

Reference Numerals a, b, c—The angles of a triangle
A, B, C—The side opposite the corresponding angle
1—Body
2—Light beam generator
3—Base
4—Radial position indicator
6—Light beam generator axis
7—Longitudinal axis of the body
20—Fixed work piece
21—Movable work piece
23—Light spot
24—Reference mark
25—Position mark
26—Apex of the angle being adjusted
50—Washer
51—Screw
52—Retention block
53—Terminal lug
54—Switch
55—Nut
56—Knob
57—Battery cap
58—Contact spring
59—Batteries

THEORY OF OPERATION

The operation of this instrument is based on two trigonometric laws:

The sum of the angles in a triangle equal 180 degrees:

$$180 = a+b+c \qquad \text{Equation 1}$$

The Law of Sines:

$$(\sin a)/A = (\sin b)/B = (\sin c)/C \qquad \text{Equation 2}$$

Which can be rewritten as:

$$B*(\sin a) = A*(\sin b) \qquad \text{Equation 3}$$

As shown in FIG. 1: a, b and c represent the vertices of a triangle and A, B and C represent the length of the sides of the triangle opposite the corresponding angle.

From Eq 1, if angle a has a fixed value, an increase in angle c must have a corresponding decrease in angle b, and conversely, a decrease in angle c must have a corresponding increase in angle b. If angle a has a fixed value and the length B is held to a fixed value, then Eq. 1 tells us that an increase in angle c will result in a decrease in angle b. In Eq 2 the product B*(sin a) becomes a constant. Therefore, a decrease in angle b must be accompanied by an increase in the length of segment A, with the inverse also being true.

It should be noted there are actually two values of angle b that can satisfy this equation, which will yield two values for angle C. As long as the values of A and B are within an order of magnitude of one another, the user will be able to determine visually if the incorrect value of angle c is set.

DESCRIPTION

The basic fundamental parts required to implement this invention are a body 1, a light beam generator 2 and a base 3.

The body 1 can be machined, injection molded, cast or produced by any manufacturing process that provides the desired balance of cost versus accuracy. The body 1 holds all of the essential elements of the instrument in correct relationship to one another. The body will have a base 3 that is used to position the instrument against a movable work piece 21, thus aligning the longitudinal axis of the body 7 parallel to the surface of the movable work piece 21. The body 1 will have a means of mounting the light beam generator 2 so that the axis of the generated light beam 6 is at the desired angle to the longitudinal axis of the body 7. The body 1 will also have a radial position indicator 4 for aligning the apex of the angle between the light beam generator axis 6 and the surface of the movable work piece 21 with a user mark 25 placed on the work piece by the user.

The light beam generator 2 may be any means of generating a small light spot 23 at the distance a particular implementation is designed to work at and of sufficient brightness to be seen under the desired operating conditions. Typically this would be a low power visible light laser, visible light laser diode module, incandescent light with columnating optics, LED with columnating optics or any of the other technology capable of producing a small light spot 23 at the desired distance.

The light beam generator 2 will be mounted to the base 1 at an angle a. The angle is determined by the desired ratio of the two measurements that the user must make as part of using the instrument. A ratio of the length of A to B is chosen for convenient mental calculation of one of the lengths after the other length is either chosen by the user or determined by the nature of the work pieces. The length B is the distance from the apex of the angle being adjusted 26c, and the radial position indicator 4. The length A is the distance from the apex of the angle being adjusted 26c, or set, and the reference mark 24. Typically, the ratio will be a ratio of two single digit integers. Typical values for the ratio of A:B are 1:1, 1:2, 1:3, 1:4, 1:5, 1:6, 1:7, 1:8, 1:9, 1:10, 2:3, 2:5, 2:7, 2:9, 3:4, 3:5, 3:7, 3:8, 3:10. The inverse of these ratios are also valid ratios. Complex ratios may be chosen for special situations where the two lengths are always specific values, such as window or door openings where the ratios are not simple but are constant values. An example would be a 36-inch wide by 78 inch high door opening.

Once the ratio of A to B is selected, the mounting angle between the light beam generator axis 6 and the longitudinal axis of the instrument 7 can be determined by the arc tangent of ratio of the lengths of sides A and B where the desired angle c is 90°. When the instrument is being manufactured for other values of angle c, the mounting angle can be determined by the following formula:

$C = \text{square root of } (A^2 + B^2 - 2AB \cos c)$ Formula 4

$a = \cos^{-1}((B^2 + C^2 - A^2)/2BC)$ Formula 5

The light beam generator 2 may be mounted to the body 1 in any fashion that keeps the light beam generator axis 6 correctly aligned. The simplest mounting would be a hole bored at the correct orientation into which the light beam generator 2 could be slid or pressed. For different degrees of accuracy, adjustable mounts may be used, as may other mounts as long as they provide the necessary alignment of the light beam generator 2.

The base 3 of the instrument will typically be a flat surface although a v-groove in the base can be used as well to allow use with pipes and other cylindrical work pieces.

The radial position indicator 4 may be the end of the instrument, a line or other mark on the side or sides of the body 1, a groove across the base 3 or any other means of clearly indicating what point on the instrument needs to be aligned with the position mark 25.

DETAILED DESCRIPTION

Typical Embodiment

FIG. 2, 3

The instrument presented in cross section in FIG. 2 is a typical embodiment. Shown is an instrument where the body 1 is machined from a rectangular block of aluminum although any material and process that can support the same features can be used. A hole is made in the body 1 at the angle to support a ratio of A:B of 1:2. The bore is sized to fit a light beam generator 2, which is a commercially available columnated laser diode module. The bottom side of the block of aluminum serves as the base 3. The edge of the block diagonally opposite the light beam generator bore hole serves as the radial position indicator. The instrument has provisions for inserting a pair of batteries 59 and a battery cap 57 fitted with a contact spring 58. A switch 54 is mounted fastened to the instrument with nut 55 and provided with a knob 56. The hole created for the switch is closed with a plug 60. The positive battery terminal is a screw 51 fitted with a terminal lug 53, a washer 50 and screwed into a non-conducting retention block 52. The light beam generator 2 is connected in series with the switch 54 and the batteries 59 as shown in FIG. 3.

Operation

FIGS. 4-7

The user measures a distance from the apex of the angle being adjusted 26 out a convenient distance B along the movable work piece 21 and places a position mark. If convenient, the end of the movable work piece 21 may serve as the position mark. The user calculates the length A based on the ratio of A to B for the instrument being used. Distance A is then measured along the fixed work piece 20 and a reference mark 24 is made on the fixed work piece 24 as shown in FIGS. 4 and 6. The user then places the instrument against the movable work piece 21 and aligns the radial position indicator 4 with the position mark 25. The user observes the position of the light spot 23 relative to the reference mark 24 and moves the movable work piece 21 to increase the angle between the fixed and movable work pieces 20, 21 if the relationship is as shown in FIG. 5A. If the position of the light spot 23 relative to the reference mark 24 is as shown in FIG. 7B the user adjusts the movable work piece 21 to decrease the angle. When the light spot 23 is coincident with the reference mark 24 FIG. 6C, the work pieces are correctly aligned at the desired angle.

Alternatively, if the nature of the work pieces is such that it would be more convenient to place the instrument against the fixed work piece 20 this can also be done. The user simply changes where the distances A and B are measured, with distance B being measured along the fixed work piece 20 and distance A being measured along the movable work piece 21. The user then adjusts the movable work piece using the same logic described previously until the light spot 23 and the reference mark 24 are correctly positioned, FIG. 6C.

I claim:

1. An angle setting instrument for determining when two members are adjusted to a desired inter-member angle, said instrument comprising:
   a) a body,
   b) said body having a base that aligns the instrument to the surface of the first member,
   c) a radial position indicator which the user positions distally a user determined first distance from the apex of said desired inter-member angle along the length of said first member;
   d) a light beam generator mounted to said body with the axis of the generated light beam at a projection angle to said base causing a light spot to be projected onto the second member where said light spot will align a user determined second distance from said apex of said desired inter-member angle along the second member when the angle between the two members is at said desired inter-member angle.

2. An angle setting instrument as recited in claim 1, wherein said light beam generator is a laser.

3. An angle setting instrument as recited in claim 1, wherein said light beam generator is a laser diode with optics to create a light beam.

4. An angle setting instrument as recited in claim 1, wherein said light beam generator is a laser diode module.

5. An angle setting instrument as recited in claim 1, wherein said light beam generator is an LED with optics to create a light beam.

6. An angle setting instrument as recited in claim 1, wherein said light beam generator is a incandescent lamp with optics to create a light beam.

7. An angle setting instrument as recited in claim 1, wherein said light beam generator has optics to create a fan shaped light beam.

8. An angle setting instrument as recited in claim 1, wherein said desired projection angle has a trigonometric tangent with a value that can be represented as a ratio of two single digit integers.

9. An angle setting instrument as recited in claim 8, where said ratio is 1:1.

10. An angle setting instrument as recited in claim 8, where said ratio is 1:2.

11. An angle setting instrument as recited in claim 8, where said ratio is 1:3.

12. An angle setting instrument as recited in claim 8, where said ratio is 1:4.

13. An angle setting instrument as recited in claim 8, where said ratio is 1:5.

14. An angle setting instrument as recited in claim 8, where said ratio is 2:3.

15. An angle setting instrument as recited in claim 8, where said ratio is 2:5.

16. An angle setting instrument as recited in claim 8, where said ratio is 3:4.

* * * * *